(12) United States Patent
Bhimte et al.

(10) Patent No.: US 12,675,613 B2
(45) Date of Patent: Jul. 7, 2026

(54) METHOD AND SYSTEM FOR ENHANCING REAL-TIME GRID SECURITY OF POWER SYSTEM

(71) Applicant: Siemens Aktiengesellschaft, Munich (DE)

(72) Inventors: Amit Bhimte, Bengaluru (IN); Aravind M N, Bangalore (IN); Bharadwaj Ranganathan Sathyanarayana, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/817,848

(22) Filed: Aug. 28, 2024

(65) Prior Publication Data

US 2026/0064893 A1     Mar. 5, 2026

(51) Int. Cl.
*G06F 21/81* (2013.01)

(52) U.S. Cl.
CPC .................................. *G06F 21/81* (2013.01)

(58) Field of Classification Search
CPC ............................ G06F 21/81; G06F 2119/06
USPC .......................................................... 726/34
See application file for complete search history.

(56) References Cited

U.S. PATENT DOCUMENTS

| | | | | |
|---|---|---|---|---|
| 2008/0215302 A1* | 9/2008 | Nasle | ...................... | G06F 30/20 |
| | | | | 703/13 |
| 2013/0306276 A1* | 11/2013 | Duchesneau | ....... | H04L 41/0816 |
| | | | | 709/225 |
| 2019/0036339 A1* | 1/2019 | Wong | ...................... | H02J 3/381 |
| 2019/0332073 A1* | 10/2019 | Nasle | ................. | G06Q 30/0206 |
| 2020/0290742 A1* | 9/2020 | Kumar | ................... | B64D 27/33 |
| 2021/0326731 A1* | 10/2021 | Nasle | ...................... | G06F 30/27 |
| 2022/0308573 A1* | 9/2022 | Ranganathan Sathyanarayana | .... | |
| | | | | G06Q 50/06 |
| 2025/0256864 A1* | 8/2025 | Catledge | .......... | G06Q 10/06312 |

OTHER PUBLICATIONS

NPL Search Terms (Year: 2025).*
NPL Search Terms (Year: 2026).*

* cited by examiner

*Primary Examiner* — Syed A Zaidi
(74) *Attorney, Agent, or Firm* — Schmeiser Olsen PLLC

(57)     ABSTRACT
A system and method for enhancing real-time grid security of a power system is provided. The method includes receiving real-time data associated with the power system and inputting the real-time data associated with the power system to a trained ML model. The trained ML model is generated based on archived historical data stored in an archival repository. Further, the method includes predicting using the trained ML model a list of contingencies with a non-zero contingency performance index score ($L_p$) for the real-time data associated with the power system. The method also includes determining an augmented contingency list comprising a user defined contingency list ($L_u$) and the predicted list of contingencies with the non-zero CPI score ($L_p$) and performing a real-time predictive contingency analysis on the power system based on the augmented contingency list.

11 Claims, 7 Drawing Sheets

200

METHOD AND SYSTEM FOR ENHANCING REAL-TIME GRID SECURITY OF POWER SYSTEM

FIELD OF TECHNOLOGY

The present disclosure relates generally to grid security of power systems, and more specifically to a method and system for enhancing real-time grid security of a power system based on an augmented contingency list dynamically generated using an ML model.

BACKGROUND

Power grids and power systems play a very important role in energy industry. These power grids are fed by various sources of renewable and non-renewable energy. A wide variety of renewable (non-fossil fuel) energy sources that are being incorporated to meet an ever-increasing energy demand are not likely to be a panacea for the impending energy issues. Further, it may be noted that there will be significant changes in the power transmission and distribution network to help meet future energy needs.

In the above backdrop, many utilities such as for example Transmission System Operators (TSO) and independent system operators (ISO) mandate high performance requirements. This is for high frequency and high volume of real-time and look-ahead grid security assessments, both dynamic and steady-state. Real-time assessment of operational security of the power grid is a very important step in grid operations. It has a huge impact to maintain reliable service, resilience to recover from disruptions, and optimal costs. Hence, contingency analysis is used to predict equipment or line failures in the power system, and to take corrective action before the system becomes unstable. To perform the contingency analysis the operator needs to know the parameters like voltage, power and voltage angle at each and every bus by doing power flow analysis on the power system.

The effect of large-scale outages, grid failures and black-outs are very severe and cost several million dollars or euros worth of losses to business and utilities, at a substantial cost to human quality of living. It is well known that trends in decentralization and decarbonization exacerbate this effect. Some of the causes include but are not limited to reduced system inertia, high variability in renewable generation, etc. This puts the system at higher risk of grid security failures and lowers grid resilience to recover from disruptive events.

From a network security and reliability point of view, conventional state estimator algorithms are using being used since exceptionally long time with not much improvement to the same. The creation of Regional Transmission Operators pushed the technology to improve efficiency of the algorithms to cope with 30,000+ network buses, to address topology errors and parameter estimation. Therefore, there is a need to perform frequent security assessments also known as contingency analysis, with more scenario simulations to improve grid security and grid resilience.

In light of the above, there remains a need for a comprehensive solution for improving grid security and grid resilience by considering various sources of energy and their features based on real-time and historical contingency analysis conducted.

The above-mentioned challenges are addressed by the proposed solution by providing an automated, artificial intelligence based predictive contingency analysis. The proposed solution adopts a three-pronged approach of archiving historical data in an archival repository and modelling a machine learning (ML) model for predicting a list of contingencies with a non-zero contingency performance index (CPI) score. Then the predicted contingency list is combined with a user defined list of contingencies and contingency lists involving at least one equipment outages. This comprehensive contingency list is then used to perform a real-time predictive contingency analysis for the power system. The proposed solution can significantly improve grid security and resilience using advanced insights from the historical data. As a result, with more situational awareness, operators can be adequately prepared to face adverse disturbances and failures.

SUMMARY

The object of the present disclosure is achieved by a computer-implemented method for enhancing real-time grid security of a power system. The method includes receiving real-time data associated with the power system and inputting the real-time data associated with the power system to a trained ML model. The trained ML model is generated based on archived historical data stored in an archival repository. The method also includes predicting using the trained ML model a list of contingencies with a non-zero contingency performance index (CPI) score ($L_p$) for the real-time data associated with the power system and determining an augmented contingency list comprising a user defined contingency list ($L_u$) and the predicted list of contingencies with the non-zero CPI score ($L_p$). Further, the method includes performing a real-time predictive contingency analysis on the power system based on the augmented contingency list.

In one or more embodiments, trained ML model generation includes receiving the archived historical data from the archival repository and performing pre-processing of the received archived historical data. Further, the method includes extracting from the archived historical data, features (x) and target variables (y) for identifying a plurality of contingencies of the power system. The features (x) and the target variables (y) include instances associated with electrical power flows, state variables and digital, analog and discrete signals of the power system. Further, the method includes generating the trained ML model based on the features (x) and target variables (y).

In one or more embodiments, further includes classifying the extracted features (x) and the target variables (y) into a training dataset and a validation data set; training the ML model using the training dataset and validating the ML model by testing the trained ML model using the validation data set.

In one or more embodiments, storing of the archived historical data in the archival repository includes archiving historical data associated with a plurality of contingencies and management of each of the plurality of contingencies of the power system in the archival repository and determining the exhaustive contingency list ($L_E$) comprising a user-defined contingency list (LU) and at least one contingency list involving at least one equipment outages. The outage is the removal of an equipment from service either intentional or planned (i.e. for maintenance), or unplanned (i.e. due to failure). A set of devices can also together constitute an outage, such as a busbar which effectively goes out of service if one or more breakers do not operate correctly. Further, the method includes performing a contingency analysis for each archived historical data using the exhaustive contingency list and determining a series of contingency performance indices (CPI) for each archived historical data based on the contingency analysis. Then the method includes storing the CPI for each archived historical data along with the archived historical data in the archival repository.

In one or more embodiments, the historical data associated the plurality of contingencies and the management of each of the plurality of contingencies of the power system comprises historical state estimation (SE) solution data and historical power flow (PF) solution data associated with the power system.

In one or more embodiments, the historical state estimation (SE) solution data is received from a real-time operational energy management system (EMS) and the historical power flow (PF) solution data is received from at least one planning system.

In one or more embodiments, the exhaustive contingency list involving one or more equipment outages and can also comprises a subset of a N–1 list ($L_1$), and a N–2 list ($L_2$).

In one or more embodiments, the contingency analysis is performed in an offline system on each archived historical state estimation (SE) solution data and the historical power flow (PF) solution data using the exhaustive contingency list.

In one or more embodiments, recommending using the trained ML model the augmented contingency lists in a phased manner based on the real-time data associated with the power system.

The object of the present disclosure is also achieved by a system for enhancing real-time grid security of a power system. The system includes a processor and a memory coupled to the processor, wherein the memory comprises instructions which, when executed by the processor, configures the processor to receive real-time data associated with the power system and input the real-time data associated with the power system to a trained ML model. The trained ML model is generated based on archived historical data stored in an archival repository. The processor is also configured to predict using the trained ML model a list of contingencies with a non-zero contingency performance index (CPI) score ($L_p$) for the real-time data associated with the power system and determine an augmented contingency list comprising an user defined contingency list ($L_u$) and the predicted list of contingencies with the non-zero CPI score ($L_p$); and perform a real-time predictive contingency analysis on the power system based on the augmented contingency list.

The object of the present disclosure is further achieved by a computer program code which, when executed by a processor, causes the processor to carry out steps of the aforementioned method.

The object of the present disclosure is further achieved by a computer program product comprising computer program code which, when executed by a processor, causes the processor to carry out steps of the aforementioned method.

Still other aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details may be modified in various obvious respects, all without departing from the scope of the disclosure. Accordingly, the drawings and description are to be regarded as illustrative in nature, and not as restrictive.

BRIEF DESCRIPTION

A more complete appreciation of the present disclosure and many of the attendant aspects thereof will be readily obtained as the same becomes better understood by reference to the following description when considered in connection with the accompanying drawings.

Figure 5:
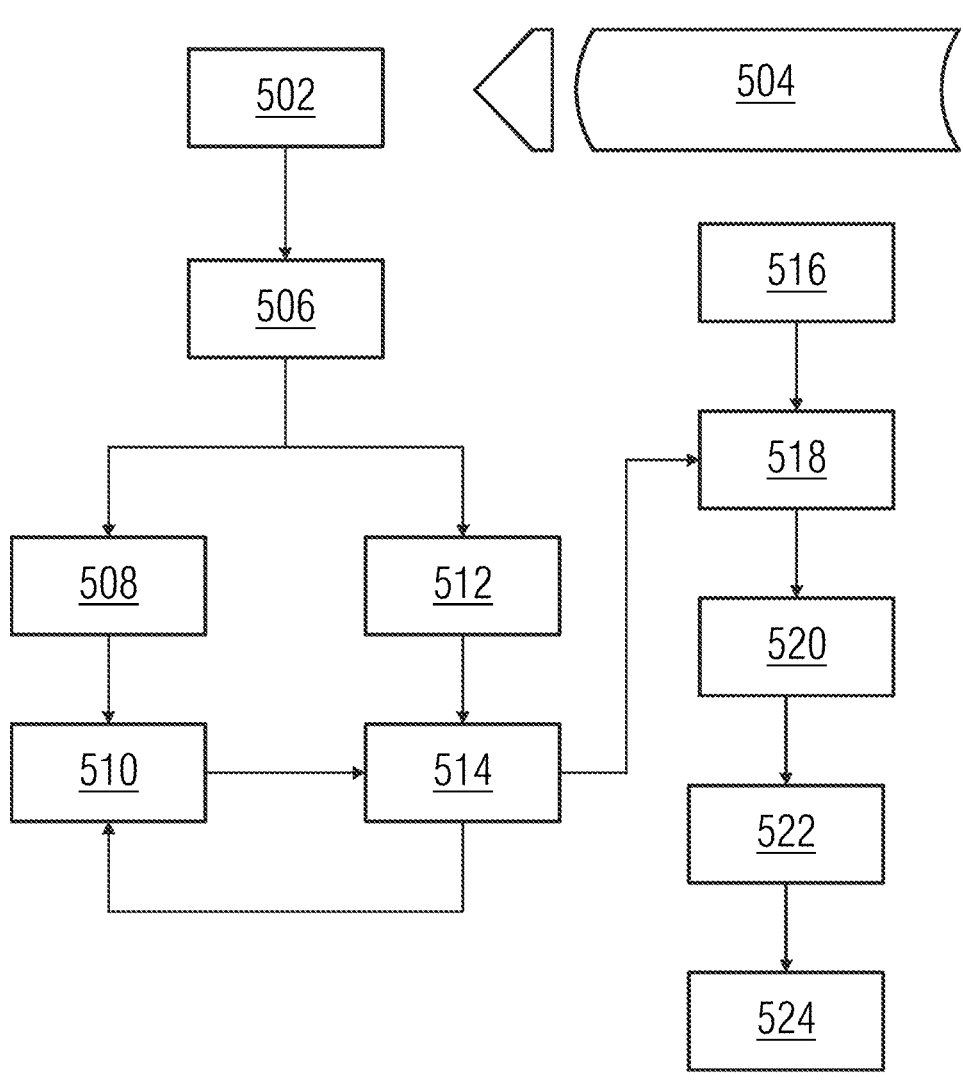
Figure 6A:
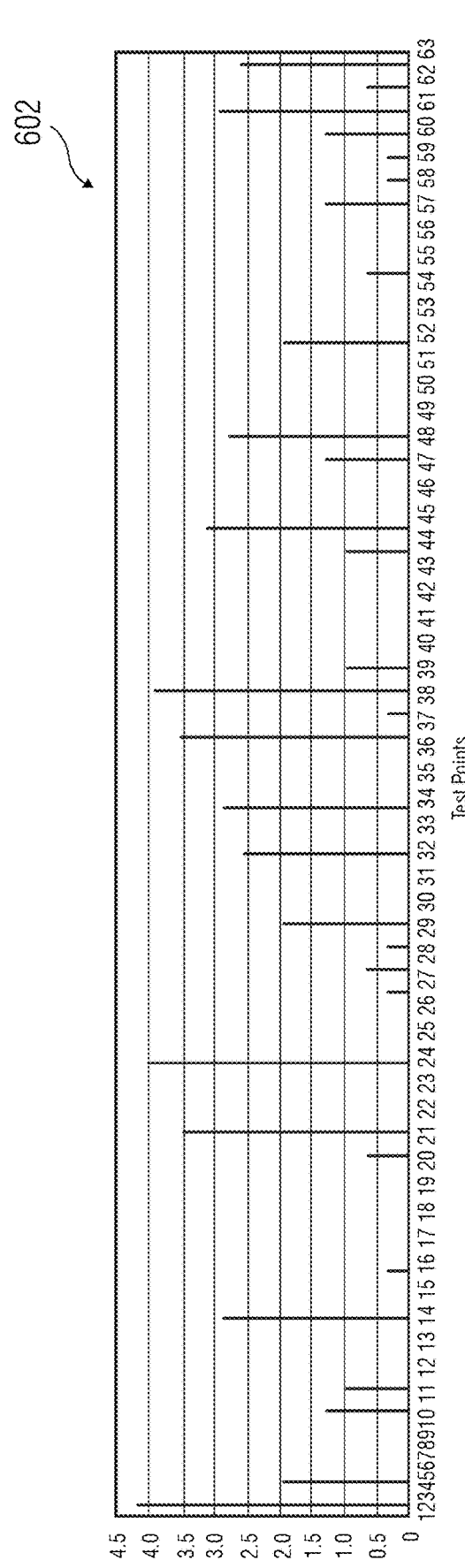

FIG. 5 is a flowchart representation of a method to determine contingencies with Non-zero CPI score, in accordance with one or more embodiments of the present disclosure; and FIG. 6A is an example of contingency prediction for multiple contingencies predicted with non-zero CPI scores, in accordance with one or more embodiments of the present disclosure; and FIG. 6 B is an example of contingency prediction for multiple contingencies predicted with non-zero CPI scores, in accordance with one or more embodiments of the present disclosure.

DETAILED DESCRIPTION

Various embodiments are described with reference to the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Examples of a method, a system, and a computer-program product for enhancing real-time grid security of a power system are disclosed herein. In the following description, for the purposes of explanation, numerous specific details are set forth in order to provide a thorough understanding of the embodiments of the disclosure. It is apparent, however, to one skilled in the art that the embodiments of the disclosure may be practiced without these specific details or with an equivalent arrangement. In other instances, well-known structures and devices are shown in block diagram form in order to avoid unnecessarily obscuring the embodiments of the disclosure. It may be noted that throughout this document, the terms Security Assessments (SA) and Contingency Analysis (CA) could be used interchangeably to denote the same real-time operation. The terms power flow analysis and load flow analysis could be used interchangeably to denote the term.

Figure 1:
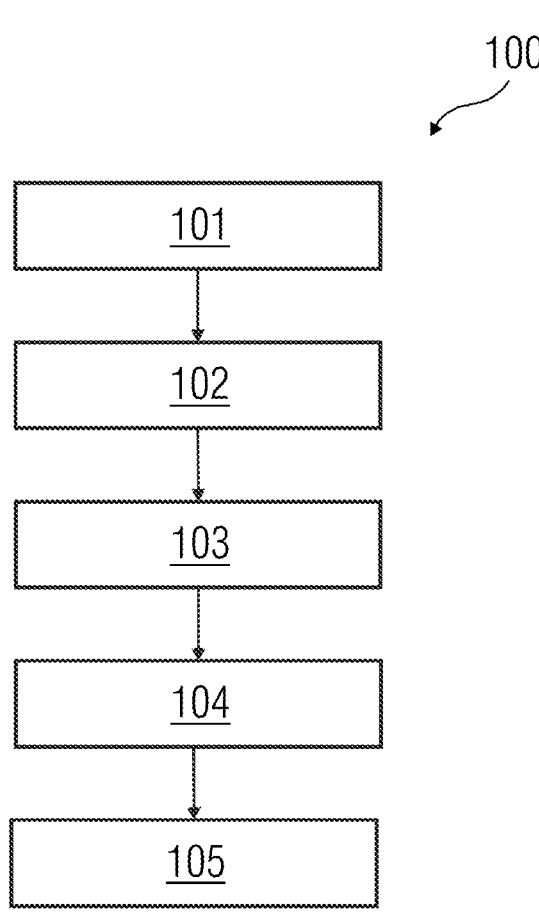
FIG. 1 is a flowchart representation of a computer-implemented method for enhancing real-time grid security of a power system, in accordance with one or more embodiments of the present disclosure.

Referring now to FIG. 1, illustrated is a flowchart of a method (as represented by reference numeral 100) for enhancing real-time grid security of a power system, in accordance with an embodiment of the present disclosure. In general, the power system's secure state is when it stays in activity inside allowable limitations in normal conditions and during any kind of disturbance. The operator may be able to determine the power system security by using real-time data, but faster assessment of security is not possible due to lengthy calculation time and generation of large amount of data. The qualitative operation of power system always requires the prediction of the contingencies within the shortest possible time with the proficient level of accuracy. As used herein, enhancing the real-time grid security of the power system refers to generating a comprehensive augmented list of contingencies which includes the conventional user defined list, along with the predicted list of contingencies with non-zero CPI score. This list is then used to perform the predictive contingency analysis on the power system. The contingency analysis is performed to analyze the power system in order to identify the overloads and problems that can occur due to a contingency. A contingency is the failure or loss of an element (e.g., generator, transformer, transmission line, etc.), or a change of state of a device (e.g., the unplanned opening of a circuit breaker in a transformer substation) in the power system. Therefore, contingency analysis is an application that uses a computer simulation to evaluate the effects of removing individual elements from a power system. By performing the predictive contingency analysis, problems and unstable situations can be identified, critical configurations can be recognized, operating constraints and limits can be applied, and corrective actions can be planned, in advance.

As a result, the proposed solution not only makes the system reliable and resilient, but also increases the efficiency with which the contingency analysis is approached by taking care of a wide range of contingencies which could cause adverse effect on the power system.

Figure 2:
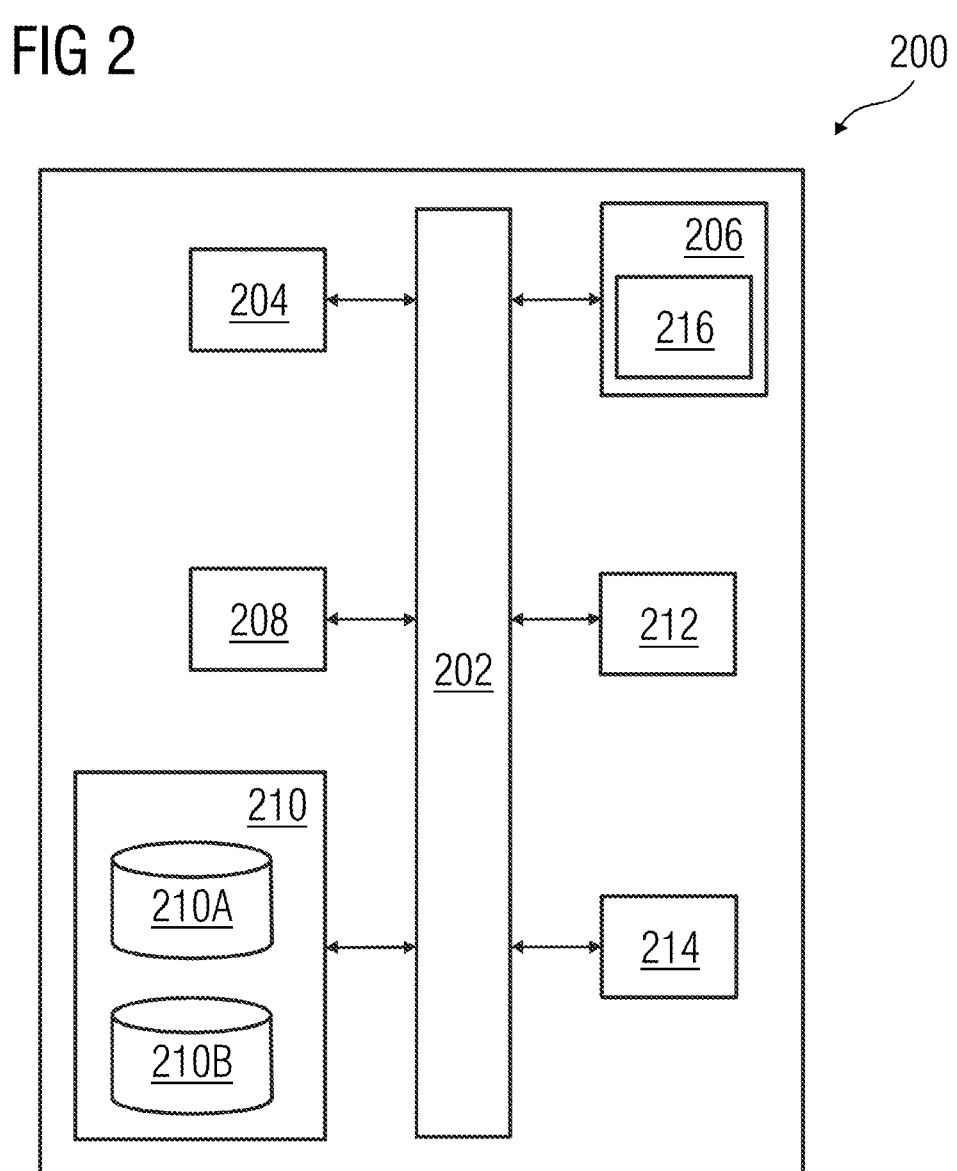
FIG. 2 is a block diagram representation of a system for enhancing real-time grid security of the power system, in accordance with one or more embodiments of the present disclosure.

Referring to FIG. 2, illustrated is a block diagram of a system 200 for enhancing real-time grid security of a power system, in accordance with one or more embodiments of the present disclosure. It may be appreciated that the system 200 described herein may be implemented in various forms of hardware, software, firmware, special purpose processors, or a combination thereof. One or more of the present embodiments may take a form of a computer program product comprising program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

In an example, the system 200 may be embodied as a computer-program product 200 programmed for performing the said purpose. The system 200 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device may be implemented in a single chip. As illustrated, the system 200 includes a communication mechanism such as a bus 202 for passing information among the components of the system 200. The system 200 includes a processor 204 and a memory 206. Herein, the memory 206 is communicatively coupled to the processor 204. In an example, the memory 206 may be embodied as a computer readable medium on which program code sections of a computer program are saved, the program code sections being loadable into and/or executable in a system to make the system 200 execute the steps for performing the said purpose.

Generally, as used herein, the term "processor" refers to a computational element that is operable to respond to and processes instructions that drive the system 200. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system 200.

Herein, the memory 206 may be volatile memory and/or non-volatile memory. The memory 206 may be coupled for communication with the processor 204. The processor 204 may execute instructions and/or code stored in the memory 206. A variety of computer-readable storage media may be stored in and accessed from the memory 206. The memory 206 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In particular, the processor 204 has connectivity to the bus 202 to execute instructions and process information stored in the memory 206. The processor 204 may include one or more processing cores with each core configured to perform independently. A multi-core processor enables multiprocessing within a single physical package. Examples of a multi-core processor include two, four, eight, or greater numbers of processing cores. Alternatively, or in addition, the processor 204 may include one or more microprocessors configured in tandem via the bus 202 to enable independent execution of instructions, pipelining, and multithreading. The processor 204 may also be accompanied with one or more specialized components to perform certain processing functions and tasks such as one or more digital signal processors (DSP), and/or one or more application-specific integrated circuits (ASIC). Other specialized components to aid in performing the inventive functions described herein include one or more field programmable gate arrays (FPGA) (not shown), one or more controllers (not shown), or one or more other special-purpose computer chips.

The system 200 may further include an interface 208, such as a communication interface (with the said terms being interchangeably used) which may enable the system 200 to communicate with other systems for receiving and transmitting information. The communication interface 208 may include a medium (e.g., a communication channel)

through which the system 200 communicates with other system. Examples of the communication interface 208 may include, but are not limited to, a communication channel in a computer cluster, a Local Area Communication channel (LAN), a cellular communication channel, a wireless sensor communication channel (WSN), a cloud communication channel, a Metropolitan Area Communication channel (MAN), and/or the Internet. Optionally, the communication interface 208 may include one or more of a wired connection, a wireless network, cellular networks such as 2G, 3G, 4G, 5G mobile networks, and a Zigbee connection.

The system 200 also includes a database 210. As used herein, the database 210 is an organized collection of structured data, typically stored in a computer system and designed to be easily accessed, managed, and updated. The database 210 may be in form of a central repository of information that can be queried, analysed, and processed to support various applications and business processes. In the system 200, the database 210 provides mechanisms for storing, retrieving, updating, and deleting data, and typically includes features such as data validation, security, backup and recovery, and data modelling. The database 210 may be designed using relational or non-relational database management systems, depending on the specific requirements and preferences of the system 200. The database 210 here includes an archival repository 210A which stores archived historical data associated with multiple varieties of contingencies and management of each of the contingencies of the power system.

The system 200 further includes an input device 212 and an output device 214. The input device 212 may take various forms depending on the specific application of the system 200. In an example, the input device 212 may include one or more of a keyboard, a mouse, a touchscreen display, a microphone, a camera, or any other hardware component that enables the user to interact with the system 200. Further, the output device 214 may be in the form of a display. It is to be understood that, when reference is made in the present disclosure to the term "display" this refers generically either to a display screen on its own or to a screen and an associated housing, drive circuitry and possibly a physical supporting structure, of which all, or part of is provided for displaying information.

In the present system 200, the processor 204 and accompanying components have connectivity to the memory 206 via the bus 202. The memory 206 includes both dynamic memory (e.g., RAM, magnetic disk, writable optical disk, etc.) and static memory (e.g., ROM, CD-ROM, etc.) for storing executable instructions that when executed perform the method steps described herein for route planning of the EVs. In particular, the memory 206 includes a contingency module arrangement 216 to perform steps for managing the parking of the EVs in the depot. Also, in the system 200, the memory 206 may be configured to store the data associated with or generated by the execution of the inventive steps.

Referring to FIGS. 1 and 2 in combination, the various steps of the method 100 as described hereinafter may be executed in the system 200, or specifically in the processor 204 of the system 200, for-managing the parking of the EVs in the depot. For purposes of the present disclosure, managing the parking of the EVs in the depot in the present method 100 is embodied as a predictive algorithm for performing a predictive contingency analysis to enhance real-time grid security of the power system. It may be appreciated that although the method 100 is illustrated and described as a sequence of steps, it may be contemplated that various embodiments of the method 100 may be performed in any order or a combination and need not include all of the illustrated steps.

In embodiments of the present disclosure, at step 101, the method 100 includes receiving real-time data associated with the power system. The real-time data associated with the power system can be for example, operational state data from the power system such as for example but not limited to example, power flows, voltage, current, harmonic distortion, frequency, real and reactive power, power factor, fault current, and phase angles. The real-time data associated with the power system can also be for example current weather conditions associated with the power system such as for example but not limited to wind speed, wind direction, location, temperature, etc. The real-time data is received by the system 200 which is then input to the trained ML model 210B in the next step.

In embodiments of the present disclosure, at step 102, the method 100 includes inputting the real-time data associated with the power system to a trained ML model 210B. The trained ML model 210B is generated based on the archived historical data stored in an archival repository 210A. Each system condition or event of the artifact power system, encountered by the online or offline systems (real time operations system or planning system) are archived in a data warehousing system. From the archival repository 210A, suitable data can be queried and used to train the ML model 210B.

The archived historical data is stored in the archival repository 210A. The process includes archiving the historical data associated with multiple contingencies and its management in the archival repository 210A. The historical data associated with the contingencies and its management includes the historical state estimation (SE) solution data and the historical power flow (PF) solution data associated with the power system. The historical state estimation (SE) solution data is received from a real-time operational energy management system (EMS) and the historical power flow (PF) solution data is received from the real-time operational system studies context and potentially one planning system. Here, the power flow (PF) analysis is performed for each potential problem that is defined on the contingency list. The power flow analysis includes solving for the currents, voltages, and real and reactive power flows (MW and MVA) in each part of the power system. The PF solution data includes these calculated results for every bus and branch in the power network model. The system conditions that influence each steady state PF solution are predominantly the bus injections and the branch admittances. The bus injections are influenced by fluctuations in power consumption at load buses and generator output at generator buses.

Further, the system 200 includes determining the exhaustive contingency list ($L_E$) which includes the user-defined list ($L_U$), the N–1 list ($L_1$), and the N–2 list ($L_2$). The user-defined list ($L_U$) is an ad hoc list that is prepared by operators based on historical experience, The N–1 list ($L_1$) is a list of all contingencies involving single equipment outages and the N–2 list ($L_2$) is a list of all contingencies involving double equipment outages. The method further includes performing a contingency analysis for each archived historical data using the exhaustive contingency list to get the contingency performance index (CPI) for each archived historical data based on the contingency analysis. This CPI for each archived historical data is stored along with the archived historical data in the archival repository 210A.

The generation of the trained ML model 210B includes receiving the archived historical data from the archival repository 210A and performing pre-processing of the received archived historical data. The pre-processing is a data preparation step which makes the data ready for the future processing of the data. Processing of data involves among other things converting raw data into format suitable for ML models. Further, the method includes extracting from the archived historical data, features (x) and target variables (y) for identifying multiple contingencies of the power system. The features (x) and the target variables (y) include instances associated with electrical power flows, state variables and digital, analog and discrete signals of the power system. Then the system 200 generates the ML model 210B based on the features.

Further, the system 200 classifies the extracted features (x) and target (y) into a training dataset and a validation data set and trains the ML model 210B using the training dataset. Later, the system 200 validates the ML model 210B by testing the trained ML model 210B using the validation data set.

In embodiments of the present disclosure, at step 103, the method 100 includes predicting a list of contingencies with a non-zero contingency performance index (CPI) score ($L_p$) for the real-time data associated with the power system. Here, the trained ML model 210B is used to predict the list of contingencies with the non-zero CPI score. The ML model 210B predicts the list using the data in the archival repository 210A. The trained ML model 210B can be for example a regression model or a classification model. These models are supervised ML models which are used to predict the value of the dependent variable for new, unseen data. They model the relationship between the input features (x) and the target variable (y), allowing for the prediction of numerical values or categorical values. Therefore, the regression or classification model is able to provide predictions that are both unbiased and precise. The contingencies can be for example but not limited to line outage, branch outage, generation unit outage, transmission line overload, bus voltage out of limit conditions, etc.

In embodiments of the present disclosure, at step 104, the method 100 includes determining an augmented contingency list which includes an user defined contingency list ($L_u$) and the predicted list of contingencies with the non-zero CPI score ($L_p$). The exhaustive contingency list ($L_E$) includes the user-defined list (Lt), the N−1 list ($L_1$), and the N−2 list ($L_2$). The augmented contingency list is generated by combining the user defined contingency list ($L_u$) and the predicted contingencies with the non-zero CPI score ($L_p$).

In embodiments of the present disclosure, at step 105, the method 100 includes performing a real-time predictive contingency analysis on the power system based on the augmented contingency list. Finally, the system 200 performs the predicted contingency analysis on the power system based on the augmented contingency list. Therefore, unlike the conventional methods which use either the user defined list only or the N−1/N−2 list only the proposed solution uses the widest possible list of contingencies. As a result, in the proposed solution the contingency analysis is performed on the complete list of contingencies making the power system highly reliable and fail-proof. The method also includes recommending the augment contingency lists in a phased manner based on the real-time data associated with the power system.

Figure 3:
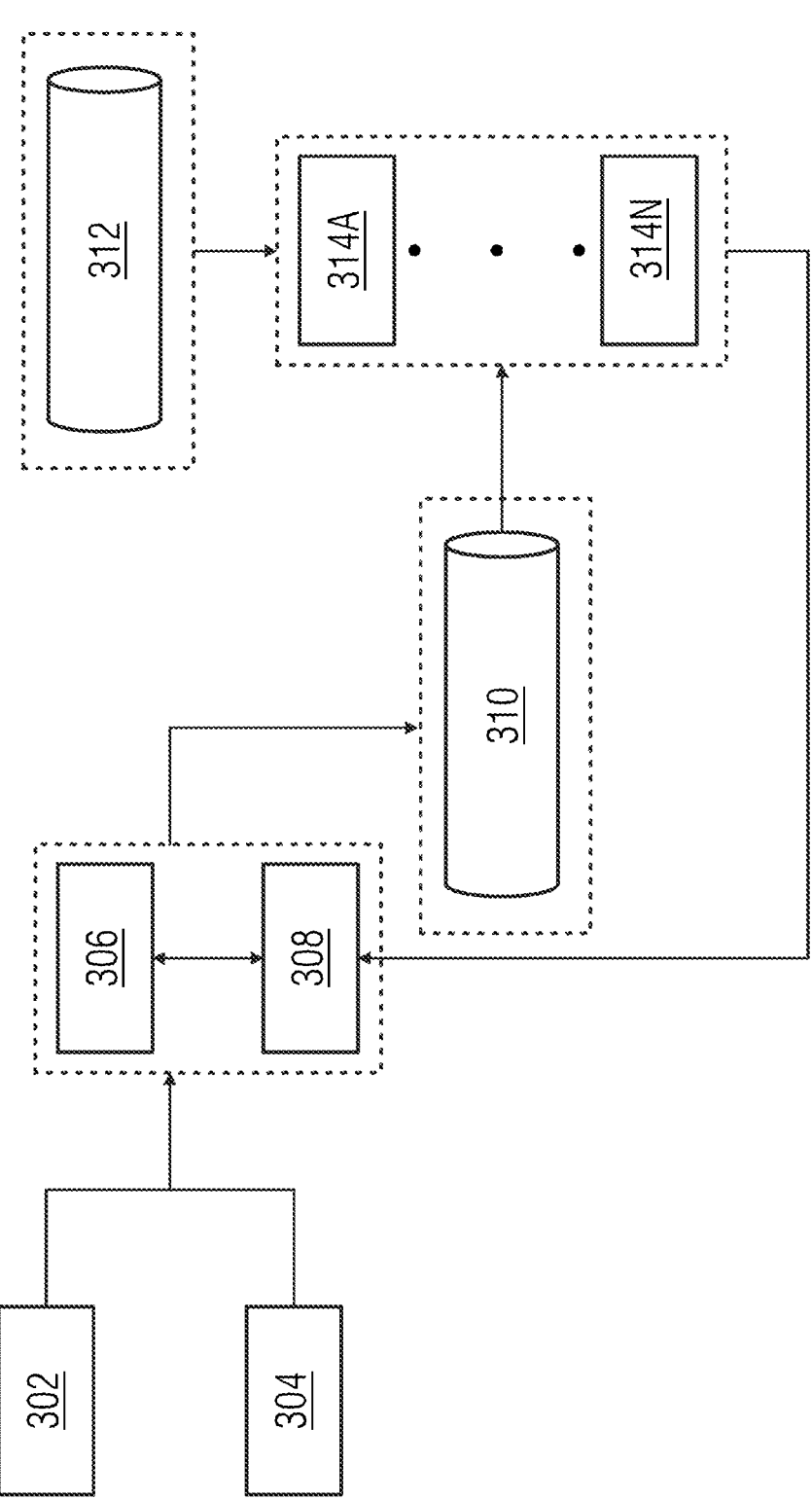
FIG. 3 is a flowchart representation of the method for performing the data archival for the contingency analysis of the power system, in accordance with one or more embodiments of the present disclosure.

FIG. 3 is a flowchart representation of the method for performing the data archival for the contingency analysis of the power system, in accordance with one or more embodiments of the present disclosure. The contingency analysis is performed based on an electrical model of the power system which is called the "network model". The network model is a simulated model of the power system which is prepared to translate the real-world equipment and connections of the power system into a mathematical model of the power network that is suitable for solution by computer methods. This network model contains the connection information (called the topology and connectivity), and the electrical characteristics of the equipment (such as the impedance of transmission lines). The contingency analysis uses this network information (called network "parameters") and the network model to simulate, and calculate the effects of, removing an equipment from the power system or the contingencies. Referring to the FIG. 3, at step 302, the system 200 receives historical state estimation (SE) solution data from real-time operational EMS systems and at step 304 historical power flow (PF) solution data from planning systems, on request. At step 306, the system 200 performs network analysis (NA) and at 308 performs advanced analysis of the received data. The data is then sent to a NA archival system at step 310. Further, at step 312 the data from the asset archival system for training the ML models from step 314A-N.

Therefore, the proposed method utilizes the historical state estimation (SE) solution data from real-time operational EMS systems and historical power flow (PF) solution data from planning systems to archive the data in standardized vendor agnostic data exchange formats (such as for example but not limited to IEC 61970). The archival system therefore contains state estimator (SE) and power flow (PF) network solutions of historically encountered system conditions. This is then used by the system 200 for predicting the comprehensive augmented contingency list and perform the predicted contingency analysis.

Figure 4:
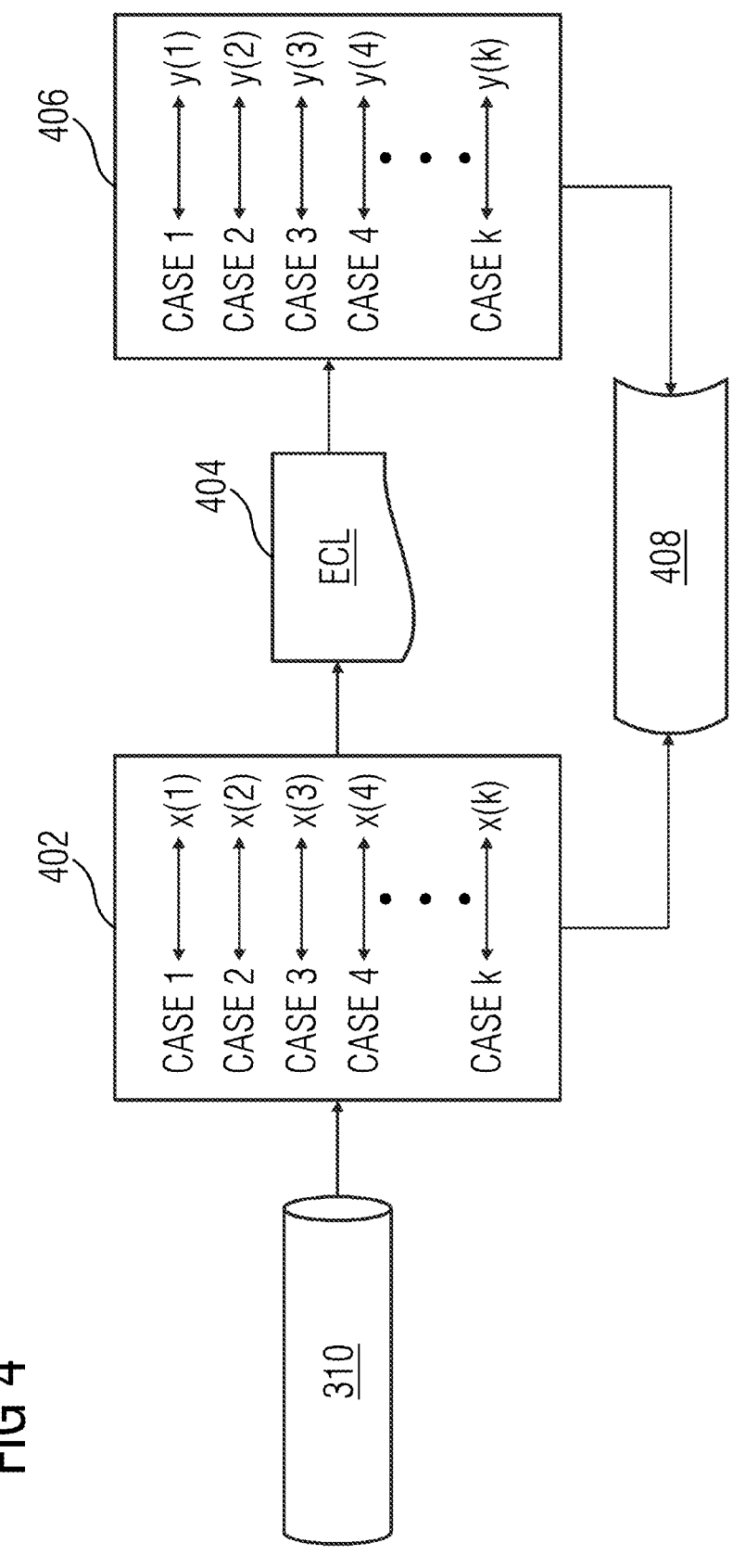
FIG. 4 is an exemplary representation of generating dataset for building a predictive machine learning (ML) models, in accordance with one or more embodiments of the present disclosure.

FIG. 4 is an exemplary representation of generating dataset for building the predictive machine learning (ML) models 210B, in accordance with one or more embodiments of the present disclosure. In general, grid operators use one of two methods to select contingency lists for performing the contingency analysis which includes:

1. User-defined list and
2. N−1 & N−2 lists

The user-defined list ($L_U$) is an ad hoc list that is prepared by operators based on the historical experience. The user-defined list ($L_U$) may include each of the elements that may be removed from the network model, one by one, to test the effects for possible overloads of the remaining elements. The N−1 list ($L_1$) is a list of all possible contingencies involving single equipment outages while N−2 list ($L_2$) is a list of all the possible contingencies involving double equipment outages. For a network with n system equipment, the cardinality of the set representing $L_1$ and $L_2$ are:

$$\|\{L_1\}\| = \binom{\eta}{1} = \eta \tag{1}$$

$$\|\{L_2\}\| = \binom{\eta}{2}$$

Where, $\eta >> 1000$

For most customers, the $L_1$ can be large and the $L_2$ is extremely large (as shown in Table 1). It may not be possible to evaluate these contingency scenarios in real-time periodically i.e., for every 1 or 2 minutes. Therefore, most customers prefer the user-defined list made of a subset of the $L_1$ and the $L_2$ lists.

TABLE 1

| Project No. | Project 1 | Project 2 | Project 3 | Project 4 |
|---|---|---|---|---|
| Bus model size | 1800 | 1200 | 6800 | 30000 |
| $\eta = |\{L_1\}|$ | 12000 | 7000 | 26000 | 230000 |
| $|\{L_2\}|$ | 72M | 24M | 338M | 26B |
| $|\{L_U\}|$ | 1500 | 1000 | 4600 | 4300 |

However, there are some drawbacks of the above-mentioned approach. Daily, weekly and seasonal load especially with the use of renewable energy sources such as for example wind energy, solar energy, etc, and consequently the grid system variations are very high. Therefore, a static list used across all variable conditions is a very limiting approach. Further, it should be noted that ad-hoc lists are a poor approach to perform mission-critical real-time assessment studies and need to be intelligent to handle current system trends.

The proposed solution solves the above-mentioned problem by coming up with the exhaustive contingency list ($L_E$), which is a sum-total of all existing contingency lists, $$L_E = L_U \cup L_1 \cup L_2. \qquad (2)$$

Therefore, for each archival data snapshot in the archival repository 210A, at 404 the contingency analysis is executed in the offline system on the base case archived historical state estimation (SE) solution data and the historical power flow (PF) solution data, using the exhaustive contingency list. The solved contingency performance indices (CPI) are stored with the input base case data in the archival repository 210A, at step 408.

The resulting data is processed to extract features (x) and target variables (y) to develop the ML model 210B. The features or the predictors can be for example but not limited to: basecase topology, basecase load generation, basecase voltages, angles, weather, etc. The target variable is contingency performance indices. The features and target variables considered are listed below: At step 402, data Features Considered (measuring unit, type):

NLI.W (MW, dict): nodal MW load injections↔RDF-ID of the load element

NLI.R (MVAR, dict): nodal MVAR load injections↔RDF-ID of the load element

NGI.W (MW, dict): nodal MW generation injections↔RDF-ID of the generating unit

NGI.R (MVAR, dict): nodal MVAR generation injections↔RDF-ID of the generating unit TOPO (binary, dict): switch position↔RDF-ID of the switching element VOLT (p.u., dict): busbar per-unit voltage↔RDF-ID of the busbar section ANG (deg, dict): busbar angle↔RDF-ID of the busbar section At step 404, target Vector (measuring unit, type):

CPI.W (%, dict): contingency active performance index↔continency sequence ID

CPI.R (%, dict): contingency reactive performance index↔continency sequence ID

The performance of the system 200 is optimized using different class of the ML techniques and different featurizers.

The trained ML model 210B is used in real-time to predict a list of contingencies that have a non-zero CPI score. This list is used along with the user defined contingency list (Lu) to generate the augmented contingency list. The system 200 then uses the augmented contingency list to perform the predictive CA over the real-time data received from the power system.

FIG. 5 is a flowchart representation of a method to determine contingencies with Non-zero CPI score, in accordance with one or more embodiments of the present disclosure. Referring to the FIG. 5, at step 502 the system 200 pre-processes the received archived historical data which is received from the archival repository 210A (504). At step 506, the system 200 then extracts features (x) and target variables (y) from the pre-processed archived historical data for identifying the contingencies of the power system.

Then at step 508, the features (x) are separated into training dataset and at step 512, the target variables (y) are separated into validation dataset. The features (x) and the target variables (y) may include but not limited to instances associated with electrical power flows, state variables and digital, analog and discrete signals of the power system. At step 510, the system 200 generates the trained ML model 210B based on the features (x) and target (y). Further, at step 514, the system 200 will use the validation dataset to evaluate the trained ML model 210B and at step 518 the trained ML model 210B which can be for example a regression or classification model is deployed.

At step 516, the system 200 receives the real-time data from the power system and inputs the received data to the trained ML model 210B which is deployed at step 518. At step 520, the system 200 predicts the list of contingencies with the non-zero CPI score ($L_p$) for the real-time data associated with the power system. Further, at step 522, the system 200 generates the augmented contingency list which includes the user defined contingency list ($L_u$) and the predicted list of contingencies with the non-zero CPI score ($L_p$). At step 524, the system 200 uses the augmented contingency list to perform the predicted contingency analysis of the power system.

Figure 6B:
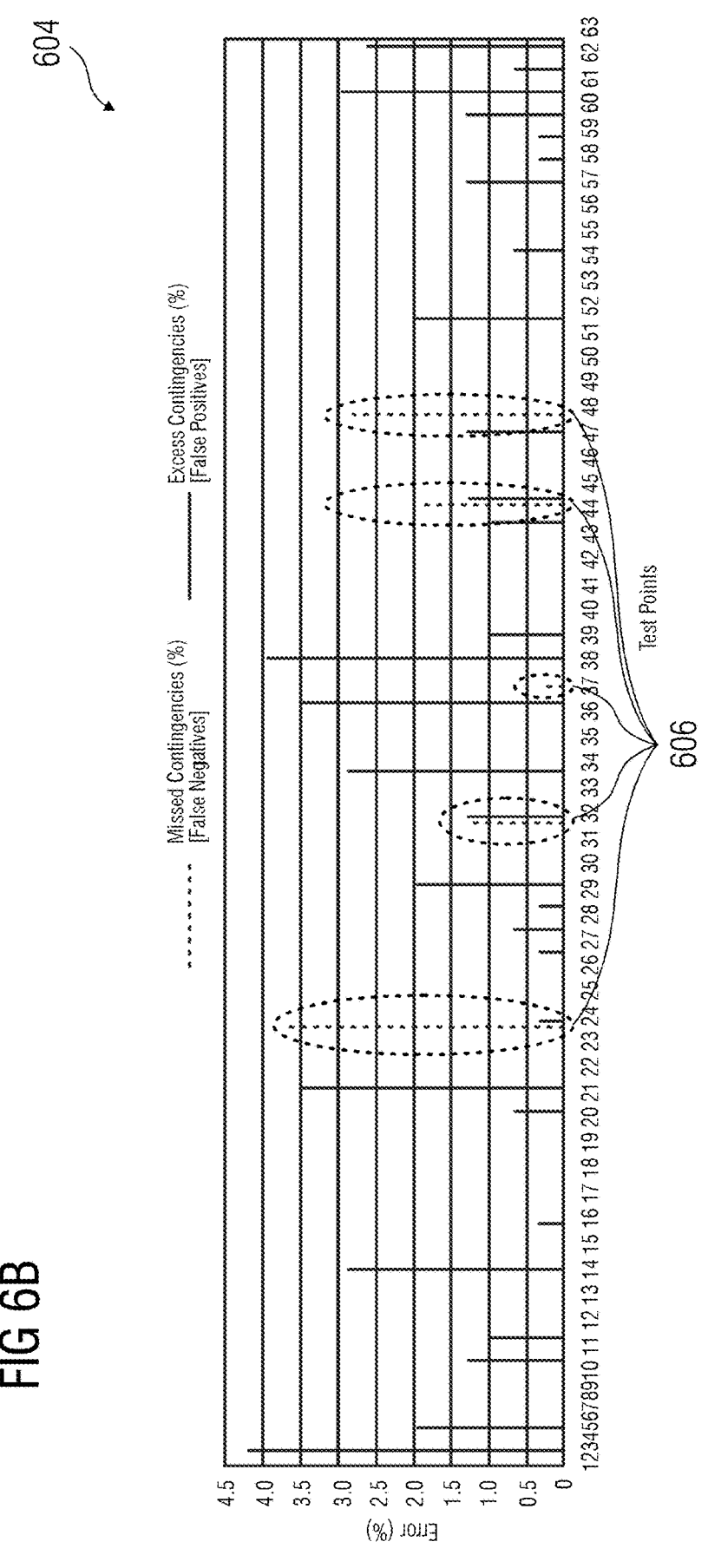

FIGS. 6A-6B is an example of contingency prediction for multiple contingencies predicted with non-zero CPI scores in the power system, in accordance with one or more embodiments of the present disclosure. Referring to the FIG. 6A, a predicted Contingency List Error is provided in percentage (602) and in the FIG. 6B a split of Predicted Contingency List Errors in percentage including missed contingencies and excess contingencies (604), are provided. However, the power system is not limited to the one provided in the example and can be extended to a power system of any size comprising large number of equipment and processes.

The proposed solution is validated using a power grid management software system. This system includes approximately 250 contingencies in LU and approximately 350 contingencies in L1. The overall number of historical data points considered are 1000, which are randomly sampled, and 100 points are used for testing and 900 points are used for model training. The predictive model is optimized on 2 different class of machine learning techniques which includes kNN (k-Nearest Neighbours) and DNN (Deep Neural Networks).

Out of the different models iterated upon, the best performing model gave an overall prediction error within 4.2% (as shown in the FIG. 6A and the FIG. 6B).

The salient features of the best performing model are:

1. Model Type: kNN (k=3)
2. Features: {NLI.W, NLI.R, NGI.W, NGI.R, TOPO)
3. Target vector: CPI.C (from conversion of CPI.W and CPI.R into categorical vector)
4. Maximum Error: 4.2%
5. Minimum Error: 0%

The observation about the best performing model is that with a limited number of historical data points, the model was able to predict to a reasonable degree, the contingencies that have a non-zero CPI score for a given system condition. (Max error: 4.2%). Out of the 100 points in the test set, 63 are seen in the FIGS. 6A-6B. False negatives (missed contingencies—606) are more important to reduce in this predictive system. It can be seen that they are considerably lower than false positives (excess contingencies). For two of the datapoints in the test set, the error percentages were significantly higher indicating outliers. There were no nearby sample points to find a best fit. However, it should be noted that as the number of data points increases the kNN performance would ideally improve.

Therefore, the proposed solution significantly improves the grid security and the resilience using advanced insights from the archived historical data. It uses historical data to learn potentially severe outages and contingencies. Then predicts a comprehensive augment contingency list which is then used to perform the predictive contingency analysis. With more situational awareness, operators can be adequately prepared to face adverse disturbances and failures. Further, the kNN models are easily to deployable and light weight albeit with good filtering techniques in data processing.

The proposed solution has real-time application and is feasible for implementation in various existing power systems. The proposed solution could alternately also be deployed in a planning approach where a customer evaluates the recommendations from the method over a planning phase to periodically augment their contingency list in a phased manner.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

REFERENCE NUMERALS method 100
step 101
step 102
step 103
step 104
step 105
system 200
bus 202
processor 204
memory 206
interface 208
database 210
archival repository 210A trained ML model 210B
input device 212
output device 214
contingency module arrangement 216
step 302
step 304
step 306
step 308
step 310
step 312
step 314A-N
step 402
step 404
step 406
step 408
step 502
step 504
step 506
step 508
step 510
step 512
step 514
step 516
step 518
step 520
step 522
step 524
predicted Contingency List Error 602
split of Predicted Contingency List Errors 604

The invention claimed is:

1. A method for enhancing real-time grid security of a power system, the method comprising:

receiving, by a processor, real-time data associated with the power system;

inputting, by the processor, the real-time data associated with the power system to a trained ML model, wherein the trained ML model is generated based on archived historical data stored in an archival repository;

predicting, by the processor, using the trained ML model a list of contingencies with a non-zero contingency performance index score ($L_p$) for the real-time data associated with the power system;

determining, by the processor, an augmented contingency list comprising a user defined contingency list ($L_u$) and the predicted list of contingencies with the non-zero CPI score ($L_p$); and performing, by the processor, a real-time predictive contingency analysis on the power system based on the augmented contingency list.

2. The method according to claim 1, wherein the trained ML model generation comprises:

receiving, by the processor, the archived historical data from the archival repository;

performing, by the processor, pre-processing of the received archived historical data;

extracting, by the processor, from the archived historical data, features (x) and target variables (y) for identifying a plurality of contingencies of the power system, wherein the features (x) and the target variables (y) comprises instances associated with at least one of electrical power flows, state variables, digital signals, analog signals and discrete signals of the power system; and generating, by the processor, the trained ML model based on the features (x) and target variables (y).

3. The method according to claim 2, further comprises:

classifying, by the processor, the extracted features (x) into a training dataset and a validation data set;

training, by the processor, the ML model using the training dataset; and validating, by the processor, the ML model by testing the trained ML model using the validation data set.

4. The method according to claim 1, wherein storing of the archived historical data in the archival repository comprises:

archiving, by the processor, historical data associated with a plurality of contingencies and management of each of the plurality of contingencies of the power system in the archival repository;

determining, by the processor, an exhaustive contingency list $(L_E)$ comprising the user-defined contingency list $(L_U)$ and at least one contingency list involving one or more equipment outages;

performing, by the processor, a contingency analysis for each archived historical data using the exhaustive contingency list;

determining, by the processor, a contingency performance index for each archived historical data based on the contingency analysis; and storing, by the processor, the CPI for each archived historical data along with the archived historical data in the archival repository.

5. The method according to claim 4, wherein the historical data associated with the plurality of contingencies and the management of each of the plurality of contingencies of the power system comprises historical state estimation solution data and historical power flow solution data associated with the power system.

6. The method according to claim 4, wherein the historical state estimation solution data is received from a real-time operational energy management system and the historical power flow solution data is received from at least one planning system.

7. The method according to claim 4, wherein the at least one contingency list involving one or more equipment outages comprises a N–1 list $(L_1)$, and a N–2 list $(L_2)$.

8. The method according to claim 4, wherein the contingency analysis is performed in an offline system on each archived historical state estimation solution data and the historical power flow solution data using the exhaustive contingency list.

9. The method according to claim 1, further comprising:

recommending, by the processor, using the trained ML model the augment contingency lists in a phased manner based on the real-time data associated with the power system.

10. A system for enhancing real-time grid security of a power system, the system comprising:

a processor, and a memory coupled to the processor, wherein the memory comprises instructions which, when executed by the processor, configures the processor to:

receive real-time data associated with the power system;

input the real-time data associated with the power system to a trained ML model, wherein the trained ML model is generated based on archived historical data stored in an archival repository;

predict using the trained ML model a list of contingencies with a non-zero contingency performance index score $(L_p)$ for the real-time data associated with the power system;

determine an augmented contingency list comprising a user defined contingency list (Lu) and the predicted list of contingencies with the non-zero CPI score $(L_p)$; and perform a real-time predictive contingency analysis on the power system based on the augmented contingency list.

11. A computer program product, comprising: a non-transitory computer readable hardware storage device having computer readable program code stored therein which, when executed by a processor, cause the processor to carry out a method for enhancing real-time grid security of a power system, the method comprising:

receiving, by a processor, real-time data associated with the power system;

inputting, by the processor, the real-time data associated with the power system to a trained ML model, wherein the trained ML model is generated based on archived historical data stored in an archival repository;

predicting, by the processor, using the trained ML model a list of contingencies with a non-zero contingency performance index score $(L_p)$ for the real-time data associated with the power system;

determining, by the processor, an augmented contingency list comprising a user defined contingency list $(L_u)$ and the predicted list of contingencies with the non-zero CPI score $(L_p)$; and performing, by the processor, a real-time predictive contingency analysis on the power system based on the augmented contingency list.

\*    \*    \*    \*    \*